United States Patent
Currie et al.

(10) Patent No.: US 8,983,666 B2
(45) Date of Patent: Mar. 17, 2015

(54) ACTIVE NETWORK MANAGEMENT

(71) Applicant: University of Strathclyde, Glasgow (GB)

(72) Inventors: Robert Alastair Fraser Currie, Glasgow (GB); Graham William Ault, Glasgow (GB)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 13/866,739

(22) Filed: Apr. 19, 2013

(65) Prior Publication Data

US 2013/0238159 A1 Sep. 12, 2013

Related U.S. Application Data

(62) Division of application No. 12/742,901, filed as application No. PCT/GB2008/003849 on Nov. 17, 2008, now Pat. No. 8,457,801.

(30) Foreign Application Priority Data

Nov. 16, 2007 (GB) .................................. 0722519.6

(51) Int. Cl.
   G06F 19/00 (2011.01)
   G06F 1/26 (2006.01)
   H02J 3/00 (2006.01)

(52) U.S. Cl.
   CPC . G06F 1/26 (2013.01); H02J 3/005 (2013.01); Y04S 10/545 (2013.01); Y02E 40/76 (2013.01)
   USPC .............................. 700/277; 700/291; 700/295

(58) Field of Classification Search
   CPC .......... G06F 1/26; H02J 3/005; Y04S 10/545; Y02E 40/76

USPC .......................................... 700/277, 291, 295
   See application file for complete search history.

(56) References Cited

U.S. PATENT DOCUMENTS 3,152,286 A    10/1964   Field et al.
7,355,301 B2 *   4/2008   Ockert et al. .................... 307/29

(Continued)

FOREIGN PATENT DOCUMENTS

EP    1381132 A1   1/2004
EP    1940002 A2   7/2008

(Continued)

OTHER PUBLICATIONS

R. A. F. Currie et al: "Intitial Dsigh and Specificaton of a Scheme to Actively Manage the Orkney Distribution Network" 18th International Conference on Electricity Distribution in Turin, Italy Jun. 6-9, 2005, pp. 1-5.

(Continued)

*Primary Examiner* — Michael D Masinick
(74) *Attorney, Agent, or Firm* — W. Kevin Ransom; Moore & Van Allen PLLC

(57) ABSTRACT

A method for defining one or more ANM zones in an electricity network that has at least one energy producing/consuming device that has an output that has to be regulated. The method comprises determining the maximum power and/or current transmittable to or from a node or branch in the network at which an energy producing/consuming device that has to be regulated is to be added; determining the maximum capacity of power and/or current transmittable through that node or branch; and defining a zone (zone 1, zone 2) including the node or branch and regulated energy producing/consuming device that requires to be actively managed, in the event that the maximum power and/or current transmittable to the node or branch exceeds the maximum capacity of power and/or current transmittable through it.

29 Claims, 4 Drawing Sheets

(56) References Cited

U.S. PATENT DOCUMENTS

| | | | |
|---|---|---|---|
| 7,778,737 B2* | 8/2010 | Rossi et al. | 700/295 |
| 8,583,288 B1* | 11/2013 | Rossi et al. | 700/277 |
| 2007/0046294 A1* | 3/2007 | Matthews et al. | 324/548 |
| 2007/0129851 A1* | 6/2007 | Rossi et al. | 700/295 |
| 2007/0239373 A1 | 10/2007 | Nasle | |
| 2008/0088180 A1* | 4/2008 | Cash et al. | 307/31 |

FOREIGN PATENT DOCUMENTS

| | | |
|---|---|---|
| WO | WO2004114495 A1 | 12/2004 |
| WO | WO2007030471 A2 | 3/2007 |

OTHER PUBLICATIONS

R. A. F. Currie et al: "Design and Trial of an Active Power Flow Management Scheme on the North-Scotland Network" 19th International Conference on Electricity Distribution in Vienna, Austria May 21-24, 2007, pp. 1-4.

R. A. F. Currie et al: "Assessing the Impact of Active Power Flow Management on Scada Alarm Volume" 19th International Conference on Electricity Distribution in Vienna, Austria May 21-24, 2007, pp. 1-4.

R. A. F. Currie et al: "Active power-flow management utilising operating margins for the increased connection of distributed generation" IEE Proceedings, Generation, Transmission and Distribution, Jan. 1, 2007, vol. 1, No. 1, pp. 197-202.

G. W. Ault et al.: "Active power flow management solutions for maximising DG connection capacity" IEE Power Engineering Society General Meeting Jun. 2006, vol. 153, No. 4, p. 5.

R. A. F. Currie et al: "Methodology for determination of economic connection capacity for renewable generator connections to distribution networks optimised by active power flow management" IEE Proceedings, Generation, Transmission and Distribution, Jan. 1, 2007, vol. 153, No. 4, pp. 456-462.

T. Kato et al.: "Multi-Agent Based Control and Protection of Power Distribution System—Protection Scheme With Simplified Information Utilization" Intelligent Systems Application to Power Systems, International Conference, Nov. 2005, pp. 49-54.

A. Collinson et al.: "Solutions for the Connection and Operation of Distributed Generation" DTI Distributed Generation Programme, Jul. 2003.

John Kabouris, "Application of Interruptible Contracts to Increase Wind-Power Penetration in Congested Areas" IEE Transactions on Power Systems, Aug. 2004, vol. 19, No. 3, pp. 1642-1649.

R. A. F. Currie et al: "Facilitate Generation Connections on Orkney by Automatic Distribution Network Management" Scottish & Southern Energy, 2005, Contract K/EL/00311/00/00, URN: 05/514.

International Search Report for PCT/GB2008/003849, dated Jul. 31, 2009.

UK Search Report for GB0901968.8, dated May 26, 2009.

UK Search Report for GB0901968.8, dated Oct. 21, 2009.

\* cited by examiner

ACTIVE NETWORK MANAGEMENT

CROSS REFERENCE TO RELATED APPLICATIONS

This application is a divisional of and claims priority from co-pending U.S. patent application Ser. No. 12/742,901, filed on May 13, 2010 and entitled "ACTIVE NETWORK MANAGEMENT" which in turn is a National Stage filing of PCT/GB08/03849, filed on Nov. 17, 2008 which claims priority to United Kingdom Patent Application No. 0722519.6 filed Nov. 16, 2007, the entire contents of which are incorporated herein by reference.

FIELD OF THE INVENTION

The present invention relates to an active network management (ANM) scheme to facilitate increased connection of energy producing/consuming devices to electricity networks.

BACKGROUND OF THE INVENTION

The increased expansion of renewable and distributed generation is posing new technical, economic and regulatory challenges to the electricity industry. The growth in renewable energy sources is crucial to meeting electricity sector emissions reduction targets. It is often the case, however, that the renewable resource exists in rural areas supplied by relatively weak distribution networks. Distribution networks were not designed to accommodate high levels of renewable or distributed generation (DG) and so can act as a significant barrier to the connection and operation of DG units. Active Network Management (ANM) is emerging as a preferred solution to the connection and operation of DG units.

ANM concerns the technical challenges that can result from the connection and operation of DG units to distribution networks: power flow management, voltage control and fault level management. ANM has emerged primarily in the UK through the work of the UK Government Embedded Generation Working Group (EGWG), which later became the Distributed Generation Coordination Group (DGCG). An important outcome of one of the work streams of the DGCG was the publication of "Solutions for the Connection and Operation of Distributed Generation" DTI Distributed Generation Programme (Contractor: EA Technology, Authors: Collinson, A., Dai, F., Beddoes, A., Crabtree, J.); KJEL/00303/00/01/REP; 2003. This report is often referred to as the "Basic Active Management" or BAM report and describes solutions to the technical issues of voltage control, power flow management and fault level management for the connection and operation of individual distributed generation (DG) units. The main categories of the solutions proposed for power flow management are pre-fault constraints; post-fault constraints; direct intertripping; generator trip based on power flow measurements and generator power output control based on power flow measurements.

Power flow management based on pre-fault constraints implies the limitation of power flows to that which can be accommodated for the next circuit outage. During normal operation the worst case first circuit outage (FCO) is the N−1 contingency (the loss of the largest of N circuits). Pre-fault constraints represent the traditional approach to connecting and operating DG units and do not constitute ANM. The strategy is commonly referred to as "fit and forget" as it implies that the DG unit will connect up to the N−1 capacity of the network, therefore requiring no operator intervention unless the N−2 contingency occurs. This allows the distribution network operator (DNO) to maintain the passive operation of the system, i.e. the DG unit will not be controlled or required to provide any network support.

Post-fault constraints are applied to a DG unit after an outage has occurred on the network. The BAM report presents three main post-fault constraint strategies: direct intertripping, generator trip based on power flow measurements and generator power output control based on power flow measurements. An example of post-fault constraints using intertripping is provided in the report but this does not address issues associated with real time regulation of DG output based on network constraints. Post-fault constraints can be implemented through direct intertripping of DG units for the tripping of upstream circuit breakers. Communications are required between the branch protection systems and the circuit breaker at the DG site. The reliability of the approach is therefore dependent on the reliability of the communications between sites. On occasions when the direct intertripping scheme is unavailable the DG unit must maintain output within pre-fault constraint levels.

J. Kabouris et al have described a system to facilitate increased connection of wind generation to the Greek transmission network, see 'Application of Interruptible Contracts to Increase Wind-Power Penetration in Congested Areas'; Power Systems, IEEE Transactions on, Volume: 19, Issue: 3, Pages: 1642-1649, August 2004. The paper distinguishes between guaranteed contracts and interruptible contracts for access to available capacity on 150 kV circuits. Guaranteed contracts can be considered to be consistent with a pre-fault constraint approach. The interruptible contracts for wind generation apply real-time pre-fault constraints. The study looked at extending the capacity for wind farm connections beyond firm/pre-fault constrained levels and managing the output of connected wind farms to ensure power flows remained within firm generation transfer limits. Programmable logic controllers are used to monitor power flows and issue maximum output instructions to the wind farms in a particular area of the transmission network. Both preventive and corrective control actions are considered based on the offline calculation of transfer limits through the congested transmission corridors for certain contingencies. Power flows are limited to be within firm generation transfer limits, despite the installed capacity exceeding this level.

More recently, an ANM system using power flow management has been proposed by R. A. F. Currie, C. E. T. Foote, G. W. Ault, J. R. McDonald; "Active Power Flow Management Utilising Operating Margins for the Increased Connection of Distributed Generation"; IEE Proceedings, Generation, Transmission and Distribution, January 2007. In this, three types of generation are proposed: firm generation, non-firm generation and regulated non-firm generation. Firm Generation (FG) is a term applied to the DG units that have unconstrained access to the distribution network in the N and N−1 state. FG units do not cause the violation of constraints on the network during normal operating conditions or during the FCO. FG capacity represents the traditional approach to connecting and operating DG units. Non-Firm Generation (NFG) are DG units that are connected to the network in addition to FG. NFG are required to curtail output to meet network constraints during the N−1 condition. This is typically performed through intertripping of NFG units from branch protection systems. Regulated Non-Firm Generation (RNFG) units are DG units connected in addition to FG and NFG, the capacity for which is determined in real-time due to load variation and diversity in FG and NFG output.

The ANM scheme restricts the output of RNFG units when thermal limits on the distribution network are breached and performs preventive and corrective control on the RNFG units through output regulation and tripping. These actions are informed by real time measurement of primary system parameters with the goal to maintain current flow within acceptable and safe limits defined by operating margins. More details of this scheme can be found in the following publications: R. A. F. Currie, G. W. Ault, D. Telford; "Facilitate Generation Connections on Orkney by Automatic Distribution Network Management"; DTI Project Final Report, contract: K/EL/00311/00/00, URN: 05/514, 2005 and R. A. F. Currie, G. W. Ault, J. R. McDonald; "Methodology for the Determination of the Economic Connection Capacity for Renewable Generator Connections to Distribution Networks Optimised by Active Power Flow Management"; IEE Proceedings, Generation, Transmission and Distribution, May 2006, and G. W. Ault, R. A. F. Currie, J. R. McDonald; "Active Power Flow Management Solutions for Maximising DG Connection Capacity", IEEE PES General Meeting, Montreal, Invited Panel Paper, 2006.

Although ANM schemes are known, much of the work in this area has been theoretical and does not address the design, operation and deployment of an ANM scheme to electricity networks.

SUMMARY OF THE INVENTION

According to the present invention, there is provided a method for defining one or more ANM zones in an electricity network, the method comprising: determining the maximum power and/or current transmittable to or from a node or branch in the network; determining the maximum capacity of power and/or current transmittable through that node or branch; and defining a zone including the node or branch and generator unit(s) that requires to be actively managed, in the event that the maximum power and/or current transmittable to the node or branch exceeds the maximum capacity of power and/or current transmittable through it. The ANM zone is an area of the electricity network where the connection and operation of one or more energy producing/consuming devices must be managed to prevent technical constraints on the network being breached.

By analyzing the network to determine where the net transfer may exceed the capacity that the infrastructure can handle, the location of constraints on the network can be identified and an ANM strategy implemented.

Once the location of the energy producing/consuming devices to be actively managed is known or agreed, each device must be considered according to the principles of access to capacity (i.e. individually, in turn or collectively as required).

To determine a zone, the electrical node where the new energy producing/consuming device connects is identified, as is the power import/export routes and power produced/consumed at the electrical node. Once this is done, the maximum power and/or current transmittable to or from the node or branch is determined and compared with the maximum capacity of power and/or current transmittable through it. If the maximum power and/or current transmittable to or from the node or branch exceed the maximum capacity, then an ANM zone boundary is defined.

Once consideration of the first node is completed, the next node in the direction of power export is considered and the power import/export routes and power produced/consumed identified. The maximum power and/or current transmittable to or from the node or branch is determined and compared with the maximum allowable capacity. If the maximum power and/or current transmittable to or from the node or branch by the connected generators exceed the maximum allowed capacity, then an ANM zone boundary is defined.

This process is repeated for each node in the direction of power export until the Grid Supply Point (GSP) or logical extent of network is reached. Once this happens, the originating electrical node, where the energy producing/consuming device is connecting, is reviewed to determine if an alternative route for power export exists. If it does, then each electrical node on this route is reviewed to determine whether a zone boundary should be applied, again until the Grid Supply Point (GSP) or logical extent of network is reached Each time a new energy producing/consuming device connection is identified, the process is repeated.

Once the zones are identified, an ANM configuration is defined according to principles of access to capacity in each zone. For the example of last in first out (LIFO) capacity access arrangements, the energy producing/consuming devices to be added to the network would be considered in order of connection date priority, starting with the highest priority device being the first to connect to the network. The requirement for ANM zones would be considered for the connection of each subsequent device, but any higher priority energy producing/consuming devices would be included in the analysis.

After the ANM configuration is defined, the entire network is subject to electrical power flow analysis. This is performed individually, consecutively or collectively for each energy producing/consuming device connecting to the ANM scheme depending on the principles of access to capacity. The results of the power flow analysis are used to identify the real and reactive power flows in the system. The power flow studies identify any potential conflicts to the principles of access.

The approach to identifying zones can be performed to allow the system to be reconfigured either online or offline in the event one or more of: a change in the size or behaviour of all or part of the existing generation portfolio, including the decommissioning/mothballing of generating units; a change in the size or behaviour of demand on the network; a change in network topology or network components; addition of a new energy producing/consuming device.

According to another aspect of the invention, there is provided a method for controlling energy producing/consuming devices in an electricity network, the method comprising: setting one or more fixed or variable trigger levels to trip individual energy producing/consuming devices in the event that the trigger point is exceeded, wherein the energy producing/consuming devices are individually and sequentially disconnected from the power network until the trigger point is no longer exceeded.

By sequentially tripping individual energy producing/consuming devices, operational goals can be achieved without having to trip all energy producing/consuming devices.

The fixed or variable trigger levels are defined within one or more ANM zones of the network, as defined in the first aspect of the invention.

The method may involve applying one or more reset trigger levels which when breached reset the regulated energy producing/consuming devices to re-start producing/consuming power, the reset level being lower than the sequential trigger level.

The method may involve applying one or more trim trigger levels, which when breached causes the regulated energy producing/consuming devices to reduce their producing/consuming power. The trim level may be between the sequential trigger level and the reset level.

The method may involve applying a trip operating margin which when breached causes all of the regulated energy producing/consuming devices to stop producing/consuming power.

The method may involve varying one or more of the trigger levels. The one or more trigger levels may be varied by an amount dependent on a gradient of power export. The gradient of power export may be influenced by ramp rates of one or more of: the regulated energy producing/consuming devices; energy producing/consuming devices that have unconstrained access to the network during the N and N−1 condition (firm generation devices); energy producing/consuming devices that are required to curtail output to meet network constraints during the N−1 condition (non-firm generation); and the electrical load.

The method may further involve assessing a probability of certain pre-determined ramp rates of energy producing/consuming devices occurring and using this to determine the one or more trigger levels.

The method may further involve monitoring one or more power system parameters, such as voltage and/or current, to determine whether the one or more trigger levels are breached.

According to another aspect of the invention, there is provided a system for controlling energy producing/consuming devices in a distribution network, the system comprising means for sequentially and individually tripping or disconnecting the energy producing/consuming devices in the event that one or more trigger levels is exceeded.

According to another aspect of the invention, there is provided a method for controlling energy producing/consuming devices on an electricity network, and a system for implementing this, the method comprising: setting one or more trigger levels which when breached cause energy producing/consuming devices to stop producing/consuming power, and setting one or more trigger levels which when breached reset energy producing/consuming devices to re-start or increase producing/consuming power.

By resetting the energy producing/consuming devices to re-start producing/consuming power, it is possible to maximize the use of available network capacity. The method may also involve individually tripping the energy producing/consuming devices sequentially as required.

Preferably, the trigger levels are defined within one or more ANM zones of the network, as defined in the first aspect of the invention.

According to yet another aspect of the invention, there is provided a method for controlling energy producing/consuming devices on an electricity network, the method comprising: monitoring one or more power system parameters, such as voltage and/or current, and depending on the monitored parameters setting one or more trigger levels which when breached cause energy producing/consuming devices to stop or start or reduce or increase producing/consuming power. In this way, the trigger levels can be varied to respond to changes in the network conditions, and so the network can be actively and dynamically managed in real time.

According to yet another aspect of the invention, there is provided a system for controlling energy producing/consuming devices on an electricity network, the system comprising: means for receiving information on one or more power system parameters, such as voltage and/or current, and means for setting one or more trigger levels which when breached cause energy producing/consuming devices to stop or start or reduce or increase producing/consuming power depending on the parameters.

The system may include one or more sensors or monitoring devices for sensing or monitoring the power system parameters.

A plurality of controllers may be provided throughout the network for causing the energy producing/consuming devices to stop or start or reduce or increase producing/consuming power depending on the trigger levels and the measured parameters. Each controller may comprise a programmable logic controller or microprocessor based system.

According to yet another aspect of the invention, there is provided a system for controlling energy producing/consuming devices that have to be regulated on an electricity network, the system adapted to: receive information on one or more measured power system parameters, such as voltage and/or current within one or more zones that have to be actively managed; apply one or more trigger levels to each zone; and cause the energy producing/consuming devices in a zone to stop or start or reduce or increase producing/consuming power when the one or more trigger levels are breached in that zone.

The system may include at least one sensor or monitoring device for sensing or monitoring the power system parameters.

The system may comprise one or more controllers or processors for receiving the information; applying the parameters and controlling the regulated energy producing/consuming devices.

Communication means may be provided for communicating the sensed parameters from the energy producing/consuming devices and/or for communicating control instructions to the energy producing/consuming devices.

The one or more trigger levels include one or more of: a trip operating level at which all the regulated energy producing/consuming devices are disconnected; a sequential trip operating level, at which regulated energy producing/consuming devices are sequentially disconnected; a trim operating level, at which the output of regulated energy producing/consuming devices is reduced; and a reset trigger level, at which any disconnected regulated energy producing/consuming devices are re-connected to the network.

According to another aspect of the invention, there is provided one or more computer programs having code or instructions for implementing any of the methods of the invention. Preferably, the computer program is provided on a data carrier or computer readable medium. The computer program may be implemented in hardware or software.

BRIEF DESCRIPTION OF THE DRAWINGS

Various aspects of the invention will now be described by way of example only and with reference to the accompanying drawings, of which.

DETAILED DESCRIPTION OF THE DRAWINGS

Figure 1A:
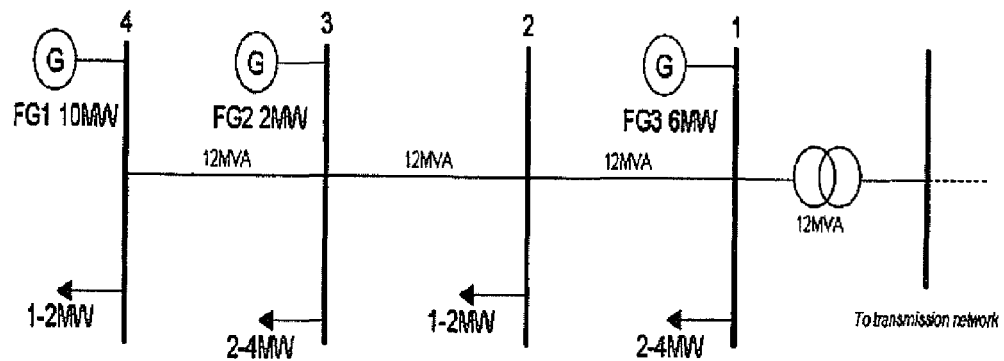
FIG. 1(a) is a schematic of a typical radial distribution network.

The present invention relates to various aspects of active network management, including the setting up and monitoring of zones in the network that have to be actively managed to ensure that network constraints are complied with. This is generally done as and when new producing/consuming devices are added to an existing network, for example new renewable energy sources.

The first step is to identify the first new energy producing/consuming device and the node to which it is to be connected. Then power import/export routes and the power produced/consumed at the electrical node are determined and an ANM zone boundary condition applied to assess whether the export route node capacity could be exceeded. By comparing the maximum power/current that can be transmitted with the maximum capacity of the node being considered, zones that have to be actively managed can be identified. The invention takes as its formulation the application and adaptation of Kirchoff's current law. In doing so, issues relating to coincident constraints on an electricity network are addressed. The method for determining the boundaries of zones can be expressed using the following ANM zone boundary condition:

$$\sum_{i=1}^{n} S_{transfer} + \sum_{i=1}^{n} S_{produced} - \sum_{i=1}^{n} S_{consumed} > S_{max} \qquad (1)$$

Where, $\sum_{i=1}^{n} S_{transfer}$ = Maximum transfers or contributions from $n$ nested zones or other network areas ($A$ or $MW$ or $MVA$)

$\sum_{i=1}^{n} S_{produced}$ = Maximum summated rated output of $n$ energy producing devices within zone ($A$ or $MW$ or $MVA$)

$\sum_{i=1}^{n} S_{consumed}$ = Summated minimum demand of $n$ energy consuming devices within zone ($A$ or $MW$ or $MVA$)

$S_{max}$ = Maximum capacity at zone import/export boundary ($A$ or $MW$ or $MVA$)

If the resulting net transfer is greater than the static, seasonal or dynamically determined export capacity from the node being considered ($S_{max}$) then an ANM zone is defined. If the net transfer is below the static, seasonal or dynamically determined export level then an ANM zone is not required.

Once the first node is assessed, the next node in direction of power export has to be considered and the process repeated until the Grid Supply Point (GSP) or logical extent of the network is reached. This process is then repeated for each export route for current and power from the electrical node being considered and each new generator. At this stage, an ANM configuration is defined according to principles of access to capacity in each ANM zone. To ensure that the principles of access are adhered to, power system studies are performed for the connecting energy producing/consuming device(s). Techniques for doing such power system studies are known in the art and therefore will not be described in detail.

ANM zones can be nested within one another, or exist in isolation. The contribution of nested ANM zones or other network areas to the net transmittable current or power from an ANM zone is recognized in equation (1) by the term:

$$\sum_{i=1}^{n} S_{transfer}$$

This relates to any current or power flowing into or out of the electrical node being considered and so can be a positive or negative value.

While the electrical notation for apparent power (S) is used here, the most general meaning of S is implied through reference to current (in A), real power (in MW) and apparent power (in MVA). The actual calculations for S in equation (1) and subsequent equations, expressions and explanations must take into account the vector form of S. In many cases, $S_{max}$ is predetermined or known. However, it could be a real time value determined by for example monitoring and evaluating dynamic line ratings, which may in practice vary due to weather conditions and prior loading.

Establishing ANM zones for specific network types will now be described in detail with reference to FIGS. 1 and 2, which show a radial network and a interconnected distribution system respectively, although the method can be applied to different networks and network topologies, including meshed systems. The zoning method can be performed at the planning stage when the network is set up or as and when new generators are to be added. The zoning method can also be performed at the operation stage to respond to changes to network topology.

Figure 1B:
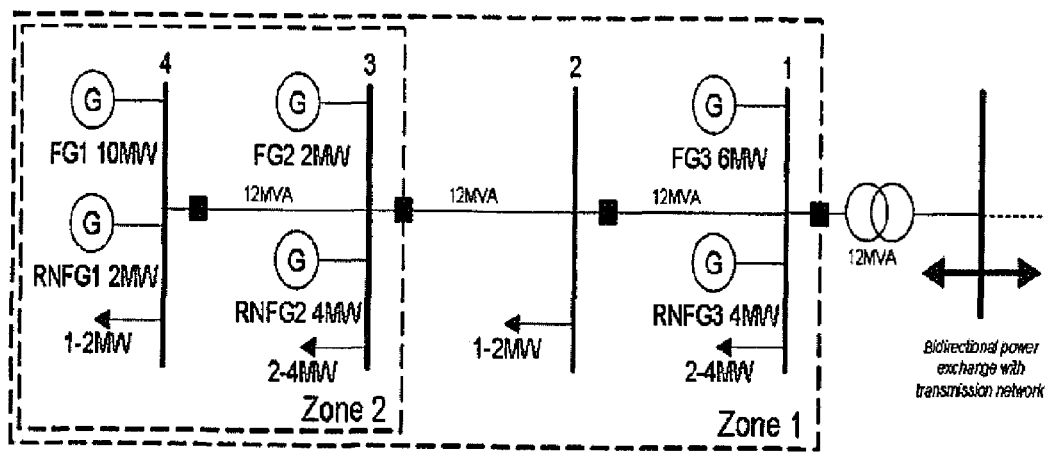
FIG. 1(b) shows ANM zones applied to the network of FIG. 1(a)

FIG. 1(*a*) shows a typical radial distribution network that has three FG units connected to a feeder via three buses 1, 3 and 4. The maximum capacity for export for this network is 12 MW. The three FG units are: FG1 (10 MW) at bus 4, FG2 (2 MW) at bus 3 and FG3 (6 MW) at bus 1. The maximum rated FG output is equal to the capacity for export (12 MW) plus the minimum load (6 MW), which gives a total of 18 MW. The operation of all or any FG units will not overload the thermal rating of the distribution network on any section of the feeder. Three RNFG units are to be connected to the radial distribution network introduced in FIG. 1(*a*): RNFG1, RNFG2 and RNFG3. The first unit RNFG1 (2 MW) is to be connected at bus 4, the second RNFG2 (4 MW) at bus 3 and the third RNFG3 (4 MW) at bus 1. It will be assumed that RNFG1 is the first to connect, followed by RNFG2 then RNFG3.

To identify the zones to be actively managed in the network of FIG. 1(*a*), RNFG1 is added to the network at bus 4, where FG1 (10 MW) is already connected. Equation (1) is then applied to bus 4 giving 12−1=11. Since this is less than the maximum capacity for export, an ANM zone is not required at bus 4. Next, equation (1) is applied to all of the electrical nodes connected to the feeder, in the direction of export from bus 4. Doing this for buses 3 and 2 also results in no ANM zone being required, i.e. no condition of generation or load demand could result in the export from bus 3 or bus 2 exceeding the circuit thermal rating of 12 MW. However, for bus 1 equation 1 results in 10+6−2=14, which is more than the maximum export capacity from bus 1, and so an ANM zone boundary is required at bus 1. This and the location of RNFG1 define a zone, which will be referred to as zone 1, as shown in FIG. 1(*b*), requiring active network management.

Consider now the addition of RNFG2 (4 MW) at bus 3. The application of equation (1) at bus 3 gives: 11+6−2=15 and 15>12, resulting in the requirement for an ANM zone boundary defining a zone, zone 2, which is nested within zone 1, as shown in FIG. 1(*b*). Following the export path from bus 3 involves the application of Equation (1) at bus 2 and bus 1. This identifies that RNFG2 also contributes to the overloading of the export from bus 1. Therefore, RNFG2 has to be actively managed for access to available export capacity from bus 1 and bus 3. Consider now, the addition of RNFG3 (4 MW) at bus 1. Application of equation (1) identifies that RNFG3 compounds the existing overloading on the export circuits from bus 1. Therefore, RNFG3 has to be actively managed for access to capacity in zone 1.

At each zone boundary, a measurement device is located or an existing device in the appropriate position used, so that the net power and/or current can be monitored in real time. To ensure that the maximum capacity at the network pinch point is never exceeded, an active network management controller (not shown) monitors these key measurements and uses them as an indicator to trigger preventative action. This will be described in more detail later.

Once the zones are defined, an ANM configuration is determined based on access to capacity criteria and the entire network is subject to electrical power flow analysis. This is performed individually, consecutively or collectively for each energy producing/consuming device connecting to the ANM scheme depending on the principles of access to capacity. The results of the power flow analysis are used to identify the real and reactive power flows in the system. In particular, the power flow studies will identify any potential conflicts to the principles of access.

The access to capacity criteria may be based on any agreed principles, for example a last in first out scheme (LIFO) scheme. In the example of FIG. 1, because RNFG1 is the first unit connected, it is only liable for curtailment based on the measured export from bus 1 and is the last of the three RNFGs to be curtailed for the constraint at this location. In contrast, RNFG2 will be curtailed before RNFG1 is impacted and RNFG3 will be curtailed before either of RNFG1 and RNFG2.

Based on a LIFO scheme, the RNFG stack for curtailment in either zone of FIG. 1(*b*) is given below in Table I.

TABLE I

RNFG STACK FOR ZONE 1 AND ZONE 2 IN FIG. 1(A)

| Zone | RNFG Stack |
|---|---|
| 1 | RNFG3 |
|   | RNFG2 |
|   | RNFG1 |
| 2 | RNFG2 |

In this scenario, when the export from bus 1 is measured as exceeding the allowable limit, and so the constraint at zone 1 is breached, then the RNFG units will be curtailed individually or collectively according to LIFO in the order RNFG3, RNFG2 then RNFG1. RNFG3 will be curtailed first; RNFG2 may be curtailed at the same time as RNFG3 (if RNFG3 is to be fully reduced) or after RNFG3 has been fully curtailed. RNFG1 may be curtailed at the same time as RNFG2 (if RNFG2 is to be fully reduced) or after RNFG2 has been fully curtailed. RNFG2 will be curtailed for a breach of the constraint at zone 2.

In order to decide the level of reduction or curtailment, an ANM scheme is required that will calculate a reduction in output from the RNFGs that will return the export to satisfactory levels. The delivery of an output reduction signal will preferably involve the application of operating margins implemented within an ANM scheme. This will be described in more detail later.

Figure 2A:
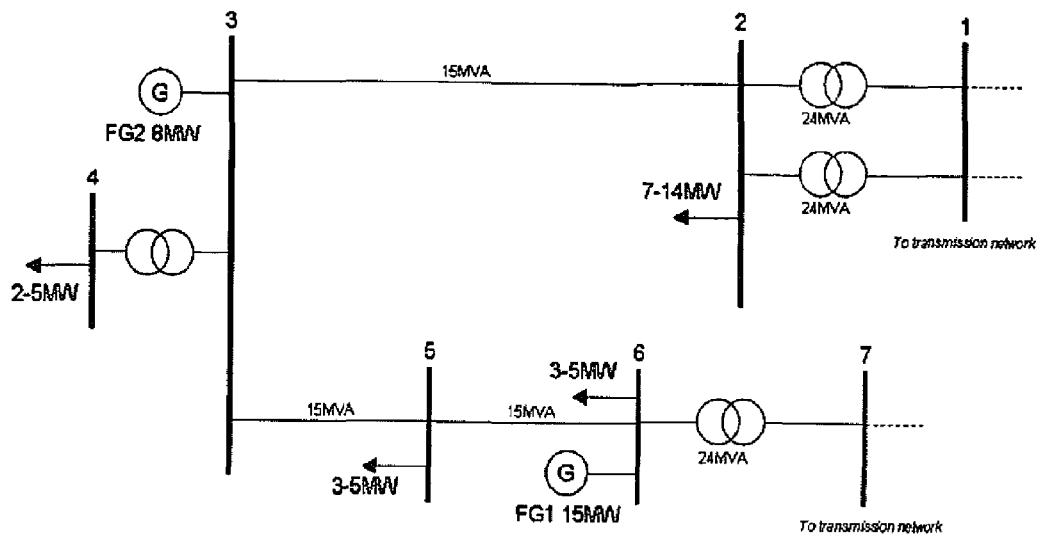
FIG. 2(a) is a schematic of a typical interconnected distribution network.
Figure 2B:
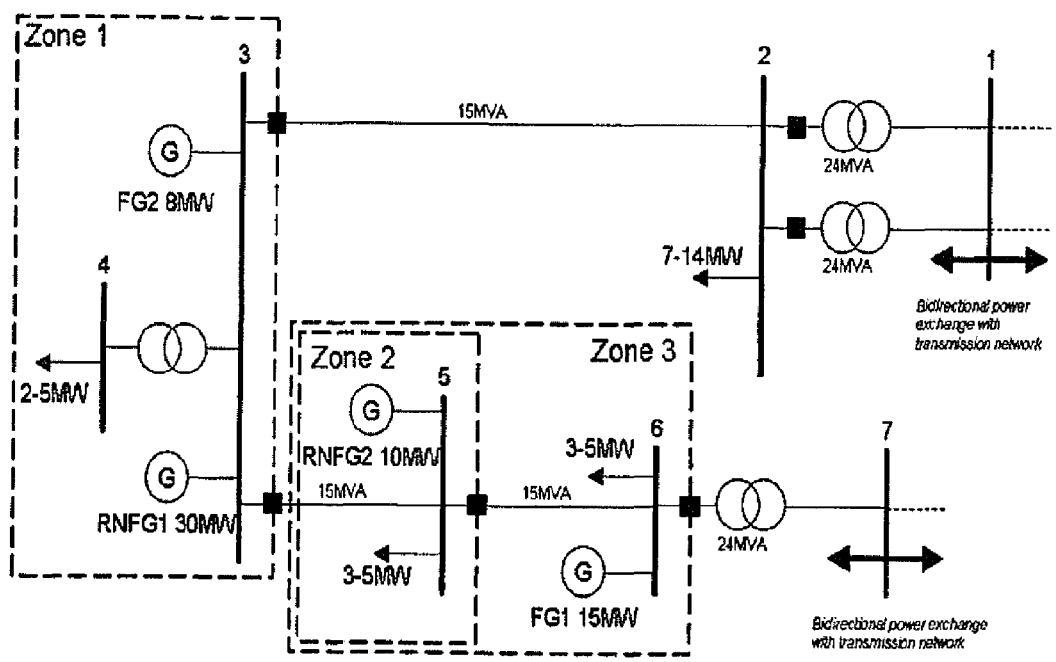
FIG. 2(b) shows ANM zones applied to the network of FIG. 2(a)

FIG. 2(*a*) shows another network to which ANM can be applied. This is an interconnected distribution network. The electrical load at buses 3, 5 and 6 (a total peak of 15 MW) can be met for the loss of either circuit between buses 3 and 2, or buses 6 and 7. There is additional electrical load at bus 2 (a peak of 14 MW). Firm Generation (FG) has been allocated on the network at bus 6 (FG 1, 15 MW) and bus 3 (FG 2, 8 MW), these FG units can operate for the loss of either circuit between buses 3 and 2, or buses 6 and 7 without overloading the remaining circuits on the distribution network. Regulated Non-Firm Generation (RNFG) units are to connect to the network at bus 3 (RNFG 1, 30 MW) and at bus 5 (RNFG 2, 10 MW). RNFG1 is first to connect, followed by RNFG2. The size of RNFG1 and RNFG2 require them to have their output regulated in real-time during normal operation and not just be inter-tripped during the first circuit outage.

To identify ANM zones, equation 1 is applied to each RNFG unit in turn. Consider firstly connection of RNFG1. In this case, 30 MW of generation capacity is added to bus 3. In this case, there are two possible export routes either between bus 3 and bus 2 or bus 3 and bus 5. Applying Equation (1) to the export from bus 3 to bus 2 gives −15+38−2=21. Since the maximum capacity is exceeded, an ANM zone is required on the export route between buses 2 and 3. This ANM zone is shown in FIG. 2(*b*) as zone 1. Applying Equation (1) to the export from bus 3 to bus 5 gives a similar result and so zone 1 is extended to cover this boundary, with measurement points defined on the export route from bus 3 to bus 5 and bus 3 to bus 2. Following each export route to each of the GSPs and applying Equation (1) at each bus in turn, there are no further ANM zones required on the interconnected network for the connection of RNFG1.

Consider now connection of RNFG2 to bus 5. Equation (1) is applied to bus 5. The maximum export from bus 5 includes the full export from bus 3 of 15 MW and so is 15+10−3=22. This is greater than the maximum capacity of 15 and so an ANM zone, zone 2, is required at bus 5, as indicated in FIG. 2(*b*). Moving one node in the direction of power export, bus 6 has to be considered. According to equation (1), the maximum export=15+15−3=27. This is greater than the maximum capacity of 24. Therefore, an ANM zone, zone 3, is required at bus 6, as shown in FIG. 2(*b*). During intact network operation, no other ANM zones are required on the network for the RNFG units considered.

At each zone boundary, a measurement device is located or an existing device in the appropriate position used, so that the net power and/or current can be monitored in real time, for example between buses 3 and 2; buses 3 and 5 and buses 5 and 6. To ensure that the maximum capacity at the network pinch point is never exceeded, an active network management controller (not shown) monitors these key measurements and uses them as an indicator to trigger preventative action. For example, when the export from bus 5 and/or bus 6 is measured as exceeding the allowable limit, the ANM calculates a reduction in output from RNFG2 based on the level of overload experienced. This will be described in more detail later.

Once the zones are defined, an ANM configuration is determined based on access to capacity criteria and the entire network is subject to electrical power flow analysis to ensure that the principles of access could not be violated. As an example, if the access to capacity is based on an LIFO scheme, the RNFG stack for curtailment in the zones of FIG. 2(*b*) is given below in Table 2.

TABLE 2

RNFG STACK FOR ZONE 1, ZONE 2 AND ZONE 3 IN FIG. 2(B)

| Zone | RNFG Stack |
| --- | --- |
| 1 | RNFG1 |
| 2 | RNFG2 |
| 3 | RNFG2 |

In this scenario, when the export from bus 3 is measured as exceeding the allowable limit, and so the constraint at zone 1 is breached, then RNFG1 is curtailed. If export from bus 5, or zone 2, is exceeded, RNFG2 is curtailed. Likewise, if export from bus 6, or zone 3, is exceeded, RNFG2 is curtailed. Both RNFG1 and RNFG2 could also require to be disconnected in the event of an outage on the system, through an intertripping arrangement from branch protection systems.

For the sake of simplicity, a LIFO access scheme is described above in the two illustrative examples. However, the principles of access to capacity can be varied to accommodate a number of situations, these include: some from of traded access rights to capacity for participating energy producing/consuming devices; some variation of nodal pricing for energy and network access such as locational marginal prices; access to capacity shared proportional to the size of each participating energy producing/consuming device and/or relative to the size of the entire portfolio of participating energy producing/consuming devices (i.e. requiring the control of all participating energy producing/consuming devices rather than individual devices), and access based on the technically and economically optimum and most effective (in terms of generator response characteristic) energy producing/consuming device or devices to respond to a breach in network constraints.

Power transfer at constrained locations (i.e. ANM zone boundaries) on the electrical network that results from the connection and operation of energy producing/consuming devices requires to be limited within the capacity of the circuit(s). This is done using operating margins, which are designed with network security in mind. The operating margins determine the capacity between different trigger levels, the breaching of which trigger ANM control instructions to be sent to energy producing/consuming devices. The operating margins can be calculated if the behaviour of the load and existing energy producing/consuming devices is known, monitored or can be assumed. For the application to managing real-time power flows, the ANM scheme can require RNFG units to achieve a set-point and desired ramp rate for both increasing and reducing power output; the desirable ramp rate can be set at the planning stage or in operational timescales.

Figure 3:
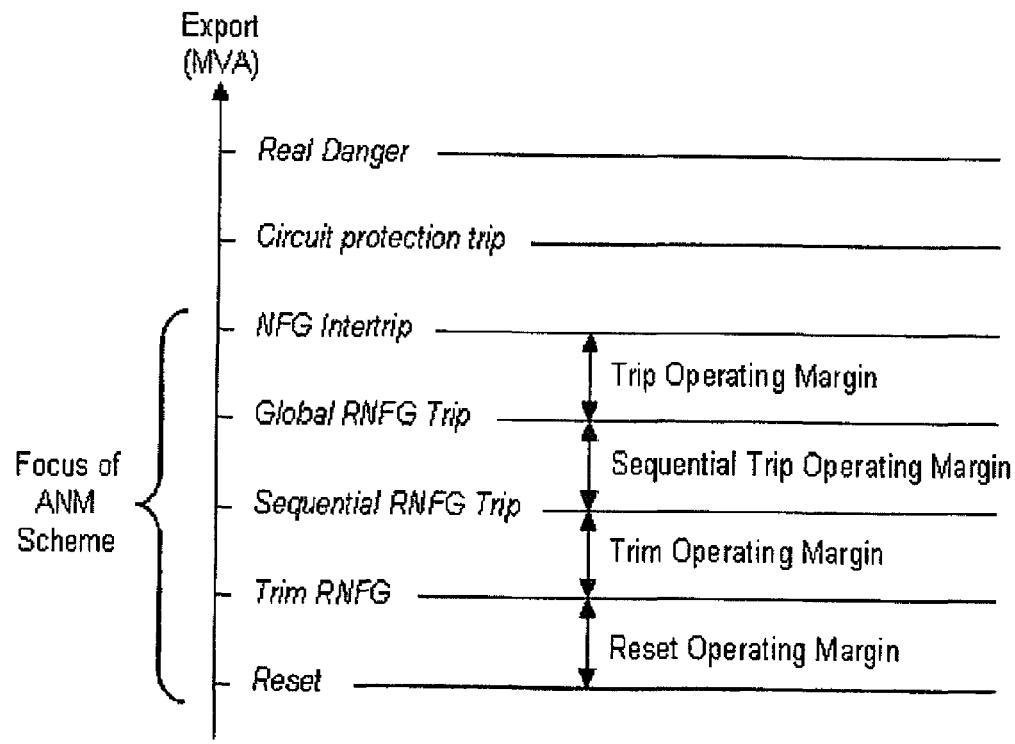
FIG. 3 shows various active network management operating margins.

FIG. 3 specifies the order of the export trigger levels that correspond to specific control instructions and the associated operating margins for an electricity network that has firm generation units (FG); non-firm generation units (NFG) and regulated non-firm generation units (RNFG). There are six export levels or margins of interest, the first for when the system approaches real danger, i.e. a dangerously high current is flowing in the circuit with implications for safety, continuity of service, asset health and asset lifetime. At this point, the export from the zone has breached all trigger levels, the ANM scheme, NFG intertripping and protection systems have failed to act, exposing the asset to extremely high current, potentially damaging the asset and posing a threat to safety. This is an extreme condition that the distribution network is designed not to reach through careful coordination and setting of protection systems.

The second export level or margin is defined as the level at which protection systems will act to open circuit breakers and remove a circuit from operation. This level is set as part of a coordinated protection scheme for overcurrent protection and the circuit is tripped by branch protection systems due to the measurement of a persistent overcurrent. The real danger and circuit trip trigger levels are employed on existing systems; it is the operating margins and the trigger levels defined below these points that are the focus of the ANM scheme. For practical implementations of operating margins on one or more intact parallel circuits, due recognition of the relative impedance of each circuit will be required.

The third margin is the NFG intertrip trigger level. When this is exceeded, NFG units are tripped to remove any subsequent overload due to a fault on a parallel circuit or due to the net export from the zone in excess of the margin. The NFG trigger point must be applied to both circuits in the case of two parallel circuits at a zone boundary, as described in:

$$S_{NFG1} = S_{Total} - (N-1)_2 \quad (2)$$

$$S_{NFG2} = S_{Total} - (N-1)_1 \quad (3)$$

Where,
$S_{NFG1}$=Level of export in circuit 1 to trigger intertrip of NFG if circuit 2 is on outage (A or MW or MVA)
$S_{NFG2}$=Level of export in circuit 2 to trigger intertrip of NFG if circuit 1 is on outage (A or MW or MVA)
$S_{Total}$=Total combined capacity of intact circuits (A or MW or MVA)
$(N-1)_1$=Export capacity lost due to outage on circuit 1 (A or MW or MVA)
$(N-1)_2$=Export capacity lost due to outage on circuit 2 (A or MW or MVA)

The next level or margin is the global RNFG trip margin. This is the level at which all RNFG units are tripped to prevent the NFG units being tripped as a result of persistent and excessive RNFG output. The global RNFG trip could also trip all RNFGs for the loss of a parallel circuit at a zone boundary. The trigger level must be applied to each circuit. Equations (4) and (5) can be used to calculate the global RNFG trigger level for the example of parallel circuits given above.

$$S_{GlobTrip1} = S_{NFG1} - OM_{Trip} \quad (4)$$

$$S_{GlobTrip2} = S_{NFG2} - OM_{Trip} \quad (5)$$

Where,
$S_{GlobTrip1}$=Level of export in circuit 1 that will cause a global trip of RNFG units (A or MW or MVA)
$S_{GlobTrip2}$=Level of export in circuit 2 that will cause a global trip of RNFG units (A or MW or MVA)
$OM_{Trip}$=Trip Operating Margin (A or MW or MVA)

The next level or margin is the sequential RNFG trip trigger level. This is used to trip individual RNFG units in consecutive order, as required to remove the breach of the sequential trip margin. This can occur when efforts to trim the RNFG have failed to reduce the export and the export continues to rise towards the 'Global RNFG trip'. The sequential trip trigger level is calculated using:

$$S_{Seq.Trip1} = S_{Glob.Trip1} - OM_{seq} \quad (6)$$

$$S_{Seq.Trip2} = S_{Glob.Trip2} - OM_{seq} \quad (7)$$

Where,
$S_{SeqTrip1}$=Trigger point in circuit 1 when the ANM scheme begins sequentially tripping one or more RNFG units in the ANM zone (A or MW or MVA)

$S_{SeqTrip2}$=Trigger point in circuit 2 when the ANM scheme begins sequentially tripping one or more RNFG units in the ANM zone (A or MW or MVA)

$OM_{seq}$=Sequential trip operating margin (A or MW or MVA)

The next level or margin is the trim RNFG. When the export breaches the 'Trim RNFG' level, the set point issued to participating units is changed to curtail the RNFG units with the goal of reducing the export to below the 'Reset' level. The RNFG units are approached individually or collectively as required, the trim RNFG trigger level is calculated using:

$$S_{Trim1} = S_{SeqTrip1} - OM_{Trim} \quad (8)$$

$$S_{Trim2} = S_{SeqTrip2} - OM_{Trim} \quad (9)$$

Where, $S_{Trim1}$=Level of export in circuit 1 that will cause trimming of RNFG unit(s) (A or MW or MVA)

$S_{Trim2}$=Level of export in circuit 2 that will cause trimming of RNFG unit(s) (A or MW or MVA)

$OM_{Trim}$=Trim operating margin (A or MW or MVA)

The last of the margins is the reset operating margin. This is the target for the trimming of RNFG units and is designed to prevent hunting around the trim RNFG export level. The reset trigger level is calculated using:

$$S_{reset1} = S_{Trim1} - OM_{Reset} \quad (10)$$

$$S_{reset2} = S_{Trim2} - OM_{Reset} \quad (11)$$

Where, $S_{reset1}$=Level of export in circuit 1 that will initiate the release of capacity to RNFG units (A or MW or MVA)

$S_{reset2}$=Level of export in circuit 2 that will initiate the release of capacity to RNFG units (A or MW or MVA)

$OM_{Reset}$=Reset operating margin (A or MW or MVA)

Figure 4:
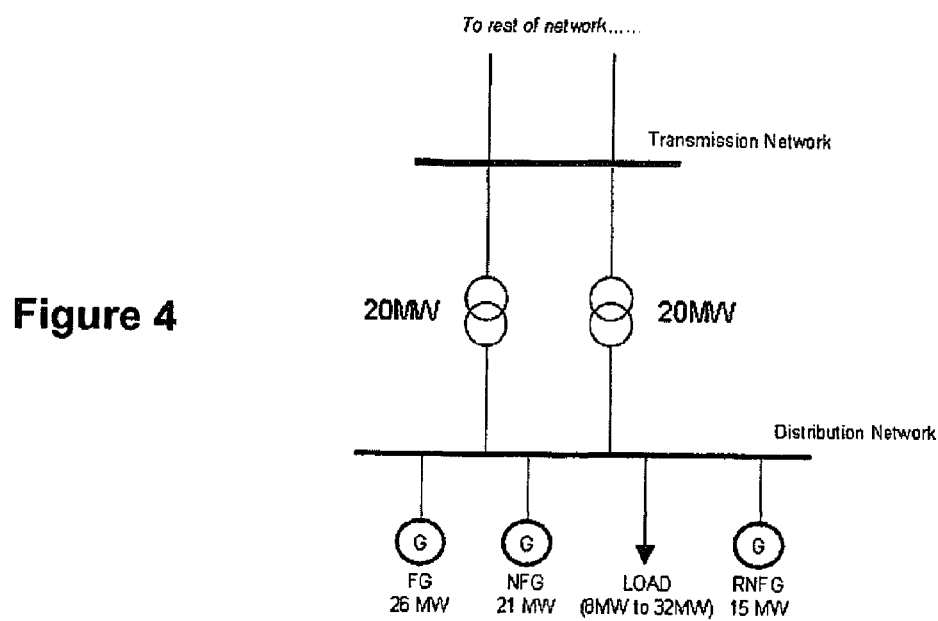
FIG. 4 is a simplified representation of the capacities for DG connection on a distribution network.

The example distribution network shown in FIG. 4 will now be used to demonstrate the calculation of operating margins and trigger levels for the ANM scheme to perform real power flow management. The limit of the existing FG connection capacity in the distribution network is 26 MW, based on a previous minimum local demand of 6 MW (the network has since experienced load growth) and an outage of one of the two largest circuits (20 MW). Additional generation connection capacity (21 MW) beyond this limit has been made available to NFG, whereby NFG will only be permitted to operate when both of the largest circuits are in service. Inter-tripping arrangements will disconnect NFG for loss of either of the largest circuits and if the total export exceeds the capacity of the remaining cable. Thus, further generator connections are constrained by a lack of available connection capacity according to established practice.

For real power flow (MW) management, the global RNFG trip operating margin can be calculated for a worst case scenario in terms of how quickly the export from an ANM zone can rise. Equation (12) provides a method of calculating the trip operating-margin. The maximum increase in export will occur when the FG, NFG and RNFG units are ramping up at the maximum rate and there is a drop in electrical demand on the network at the maximum rate that can be experienced. The addition of these rate-of-change values for all DG units and loads provides the gradient of the export from the zone. This gradient is multiplied by the total time taken to achieve the control action. This is a combination of the time it takes the ANM scheme to measure and process the breach of the trip margin (the ANM time delay, TD) and the time it takes to trip all the RNFG units (TT).

$$OM_{trip} = \left[ \begin{array}{c} \left(\sum_{FG=1}^{n}\left(\frac{dP_{FG}}{dt}\right)\right) + \left(\sum_{NFG=1}^{n}\left(\frac{dP_{NFG}}{dt}\right)\right) + \\ \left(\sum_{RNFG=1}^{n}\left(\frac{dP_{RNFG}}{dt}\right)\right) + \left(\sum_{L=1}^{n}\left(\frac{dP_L}{dt}\right)\right) \end{array} \right] \times (TD + TT) \quad (12)$$

Where, $\sum_{FG=1}^{n}\left(\frac{dP_{FG}}{dt}\right)$ = Maximum FG ramp rate (MW/min)

$\sum_{NFG=1}^{n}\left(\frac{dP_{NFG}}{dt}\right)$ = Maximum NFG ramp rate (MW/min)

$\sum_{RNFG=1}^{n}\left(\frac{dP_{RNFG}}{dt}\right)$ = Maximum RNFG ramp rate (MW/min)

$\sum_{L=1}^{n}\left(\frac{dP_L}{dt}\right)$ = Maximum load drop (MW/min)

$TD$ = Time delay (minutes)

$TT$ = Trip time (minutes)

Equation (13) provides a method of calculating the sequential trip margin. Equation (13) is in the same format as Equation (12) but instead of the trip time the sequential trip time (ST) is added to the ANM time delay (TD). The sequential trip time is the time it takes the ANM scheme to trip an individual RNFG unit, which may be staged at particular time intervals.

$$OM_{Seq} = \left[ \begin{array}{c} \left(\sum_{FG=1}^{n}\left(\frac{dP_{FG}}{dt}\right)\right) + \left(\sum_{NFG=1}^{n}\left(\frac{dP_{NFG}}{dt}\right)\right) + \\ \left(\sum_{RNFG=1}^{n}\left(\frac{dP_{RNFG}}{dt}\right)\right) + \left(\sum_{L=1}^{n}\left(\frac{dP_L}{dt}\right)\right) \end{array} \right] \times (TD + ST) \quad (13)$$

Where ST=Sequential trip time (minutes)

The trim operating margin can be calculated using Equation (14), which acknowledges that when the ANM scheme is taking measurements, processing data and issuing control instructions there is no reduction from the RNFG units. There is also the inherent inertia within a generator control scheme prior to achieving a set point reduction. The maximum increasing gradient of the export from a zone is multiplied by the ANM time delay (TD) plus the time it takes the RNFG unit to begin ramping down power production, defined here as the ramp time delay (RTD). Added to this value is the export gradient from the zone when the RNFG is ramping down at full capability, which is then multiplied by the time allocated to the ramp response, defined here as the ramping time factor (RTF). This means that the trim operating margin accounts for how long the ANM scheme takes to measure, process and issue a set point then provide the RNFG unit(s) with time to respond.

$$OM_{Trim} = \left[ \left[ \begin{array}{c} \left(\sum_{FG=1}^{n}\left(\frac{dP_{FG}}{dt}\right)\right) + \left(\sum_{NFG=1}^{n}\left(\frac{dP_{NFG}}{dt}\right)\right) + \\ \left(\sum_{RNFG=1}^{n}\left(\frac{dP_{RNFG}}{dt}\right)\right) + \left(\sum_{L=1}^{n}\left(\frac{dP_L}{dt}\right)\right) \end{array} \right] \times (TD + RTD) \right] + \quad (14)$$

-continued $$\left[\dfrac{\left(\sum_{FG=1}^{n}\left(\dfrac{dP_{FG}}{dt}\right)\right)+\left(\sum_{NFG=1}^{n}\left(\dfrac{dP_{NFG}}{dt}\right)\right)-}{\left(\sum_{RNFG=1}^{n}\left(\dfrac{dP_{RNFG}}{dt}\right)\right)+\left(\sum_{L=1}^{n}\left(\dfrac{dP_{L}}{dt}\right)\right)}\right]\times RTF$$

Where RTD=Ramp time delay (minutes) and RTF=Ramp time factor (minutes)

The reset-operating margin is calculated using equation (15), which adopts the same approach as the trip and sequential trip margin, except this time the reset time (RT) is added to the ANM time delay (TD). The reset time ensures that the RNFG units are not released too close to the trim trigger level. The reset-operating margin will ensure that the time between the RNFG units being released and the trim operating margin being breached will be at least equal to the reset time.

$$OM_{Reset}=\left[\dfrac{\left(\sum_{FG=1}^{n}\left(\dfrac{dP_{FG}}{dt}\right)\right)+\left(\sum_{NFG=1}^{n}\left(\dfrac{dP_{NFG}}{dt}\right)\right)+}{\left(\sum_{RNFG=1}^{n}\left(\dfrac{dP_{RNFG}}{dt}\right)\right)+\left(\sum_{L=1}^{n}\left(\dfrac{dP_{L}}{dt}\right)\right)}\right]\times (TD+RT) \quad (15)$$

Where RT=Reset time

FIG. 4 illustrates the FG, NFG and RNFG unit capacities being considered in this example. Provision of a similar level of capacity increase by conventional means would require installation of new circuit capacity. The cost associated with this could pose a significant financial barrier to further DG connections. The size of time delay and operating margins employed can impact on the economic viability of RNFG connections.

Equations (2)-(15) are now applied to the scenarios shown in Table III to demonstrate how to set the operating margins and trigger levels required for the ANM scheme to manage power flows.

TABLE III

SCENARIOS USED TO CALCULATE OPERATING MARGIN EXAMPLES

| Ramp rate | Scenario 1 | Scenario 2 | Scenario 3 | Scenario 4 |
|---|---|---|---|---|
| $\sum_{FG=1}^{n}\left(\dfrac{dP_{FG}}{dt}\right)$ | 5%/min | 10%/min | 20%/min | 40%/min |
| $\sum_{NFG=1}^{n}\left(\dfrac{dP_{NFG}}{dt}\right)$ | 5%/min | 10%/min | 20%/min | 40%/min |
| $\sum_{L=1}^{n}\left(\dfrac{dP_{L}}{dt}\right)$ | 5%/min | 10%/min | 20%/min | 40%/min |
| $\sum_{RNFG=1}^{n}\left(\dfrac{dP_{RNFG}}{dt}\right)$ | 5, 10, 20 and 40%/min for each scenario | | | |

The assumptions regarding the various ANM time factors used in equations (10)-(13) are provided in Table IV.

TABLE IV

TIME DELAYS USED TO CALCULATE OPERATING MARGIN EXAMPLES

| ANM Time Factor | Time (Seconds) |
|---|---|
| TD | 2 |
| TT | 1 |
| ST | 1 |
| RTD | 10 |
| RTF | 30 |
| RT | 20 |

The capacity of FG, NFG and RNFG units used in the calculations is as shown in FIG. 4. The results of the scenario analysis of operating margins are presented in Tables V-VIII.

Table V presents the results of scenario 1 and shows that a low variability of FG, NFG and local load (5%/min) results in low operating margins, allowing the network to be operated close to its full rated capacity. The trim trigger level varies between 92.5% and 95.1% for RNFG ramp rates of 5%/min and 40%/min respectively. The ANM scheme will start releasing capacity back to RNFG units at 86% to 88.2% of rated capacity dependent on the ramp rate of the RNFG units. Interestingly, the highest reset trigger point occurs at the lowest trim RNFG trigger point. This is also the case for scenarios 2 to 4. This means that the higher ramp rate of the RNFG unit(s) then the higher the export can be prior to taking action, but the lower the reset trigger due to the quicker ramp-up of RNFG unit(s) post-curtailment.

TABLE V

TRIGGER LEVELS FOR SCENARIO 1

| Trigger Point (% of rated capacity) | RNFG 5%/min | RNFG 10%/min | RNFG 20%/min | RNFG 40%/min |
|---|---|---|---|---|
| NFG Intertrip | 100.0 | 100.0 | 100.0 | 100.0 |
| Global RNFG Trip | 99.4 | 99.3 | 99.1 | 98.8 |
| Seq. RNFG Trip | 98.8 | 98.6 | 98.3 | 97.5 |
| Trim RNFG | 92.5 | 92.9 | 93.6 | 95.1 |
| Reset | 88.2 | 87.9 | 87.2 | 86.0 |

Table VI presents the results of the analysis of scenario 2. Scenario 2 considers a more variable FG and NFG output and local load of 10%. It can be seen that this results in larger operating margins and lower trigger levels for tripping, trimming and releasing RNFG units. The trim trigger level now varies from 84.6% to 87.2%, around 8% lower than for scenario 1. The reset trigger level has reduced by a similar amount to 74.5% to 76.6%. Therefore, RNFG units in scenario 2 would experience more curtailment than in scenario 1.

TABLE VI

TRIGGER LEVELS FOR SCENARIO 2

| Trigger Point (% of rated capacity) | RNFG 5%/min | RNFG 10%/min | RNFG 20%/min | RNFG 40%/min |
|---|---|---|---|---|
| NFG Intertrip | 100.0 | 100.0 | 100.0 | 100.0 |
| Global RNFG Trip | 98.9 | 98.8 | 98.6 | 98.3 |
| Seq. RNFG Trip | 97.8 | 97.7 | 97.3 | 96.5 |
| Trim RNFG | 84.6 | 85.0 | 85.7 | 87.2 |
| Reset | 76.6 | 76.3 | 75.7 | 74.5 |

Scenario 3 considers an even more variable FG and NFG output and local load. It can be seen that this results in much reduced trigger levels due to the requirement for larger operating margins. As can be seen in Table VII, the global RNFG trip and sequential RNFG trip are still above or around 95% but the trim and reset trigger levels are much reduced. The trim trigger level varies from 68.8% to 71.4% and the reset trigger level from 51.4% to 53.6%.

TABLE VII

TRIGGER LEVELS FOR SCENARIO 3

| Trigger Point (% of rated capacity) | RNFG 5%/min | RNFG 10%/min | RNFG 20%/min | RNFG 40%/min |
|---|---|---|---|---|
| NFG Intertrip | 100.0 | 100.0 | 100.0 | 100.0 |
| Global RNFG Trip | 97.9 | 97.8 | 97.7 | 97.3 |
| Seq. RNFG Trip | 95.9 | 95.7 | 95.3 | 94.6 |
| Trim RNFG | 68.8 | 69.2 | 69.9 | 71.4 |
| Reset | 53.6 | 53.3 | 52.7 | 51.4 |

Scenario 4 is the most extreme in terms of the variability in FG and NFG output and local load. For each of the RNFG ramp rates specified it is assumed that the FG, NFG and local load vary at 40%/min. It can be seen in Table VIII that this results in greatly reduced trigger levels for the ANM scheme. The global and sequential RNFG trip trigger levels are still above 90%, but the trim trigger level varies from 37.2% to 39.8%. This shows that if the FG, NFG and local load are highly variable then the capability of the RNFG units does not impact much on the size of trim operating margin required. It can also be seen in Table VIII that the situation is so severe that capacity will not be released to the RNFG units until an export is measured of 5.3% to 7.5%.

TABLE VIII

TRIGGER LEVELS FOR SCENARIO 4

| Trigger Point (% of rated capacity) | RNFG 5%/min | RNFG 10%/min | RNFG 20%/min | RNFG 40%/min |
|---|---|---|---|---|
| NFG Intertrip | 100.0 | 100.0 | 100.0 | 100.0 |
| Global RNFG Trip | 96.0 | 95.9 | 95.7 | 95.3 |
| Seq. RNFG Trip | 91.9 | 91.7 | 91.4 | 90.6 |
| Trim RNFG | 37.2 | 37.6 | 38.3 | 39.8 |
| Reset | 7.5 | 7.2 | 6.6 | 5.3 |

It can be seen in Table V-VIII that the behaviour of existing DG units and load has a large bearing on the size of operating margins employed by the ANM scheme. For faster ramp rates of RNFG the higher the trigger levels are for trimming RNFG in any scenario, implying a greater energy yield by the RNFG units. Smaller operating margins than those identified could be employed at the discretion of the network operator but may result in increased tripping of participating RNFG units. The implications of this for network performance and the participating generators would need to be considered.

Figure 5:
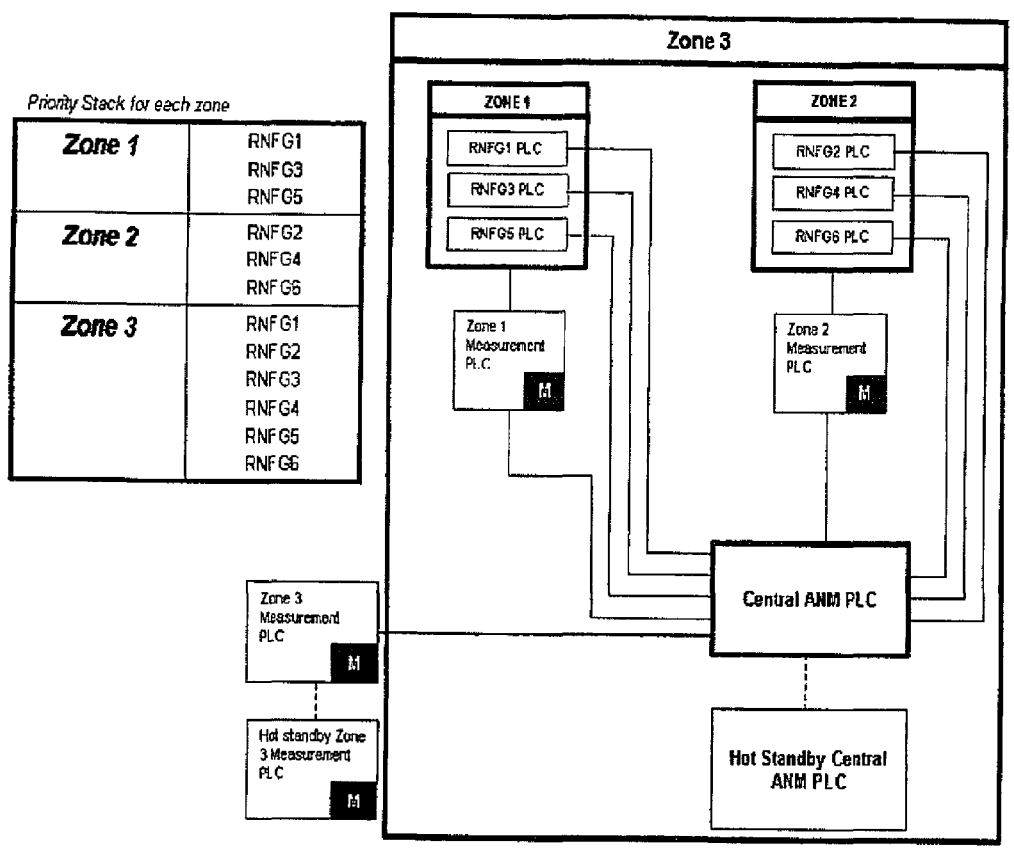
FIG. 5 is a block diagram of an ANM system.

Control and measurement of the networks described above can be done using any suitable measurement devices and controllers. FIG. 5 shows an example of an active network management system for implementing the invention on programmable logic controllers (PLC). In this case, zone 1 and zone 2 are nested within zone 3. PLCs are deployed at all measurement sites and at all RNFG units. Each RNFG PLC and measurement PLC (at each zone boundary) has a direct communications path back to a central ANM PLC.

In this case, there are six RNFG units connected to the network, RNFG1-6. RNFG1, RNFG3 and RNFG5 are located in zone 1. RNFG2, RNFG4 and RNFG6 are located in Zone 2. All RNFG units are located within zone 3.

FIG. 5 also presents a stack for each zone, with RNFG1 being the highest in priority in terms of access to available capacity in zone 1 and RNFG2 in zone 2. If the zone 1 measurement PLC measured a breach of the sequential trip margin then RNFG5 would be the first to be tripped, followed by RNFG3 and then RNFG1, assuming system conditions require all RNFG units to be tripped and all are online. If the sequential trip margin were breached at the zone 2 measurement PLC then RNFG6 would be the first to be tripped, followed by RNFG4 and then RNFG2, assuming system conditions require all RNFG units to be tripped and all are online. If the zone 3 measurement PLC measured a breach of the sequential trip margin and all six RNFG units were online then the first RNFG to be tripped would be RNFG6, followed by RNFG 5 and moving up through the stack as required until the export is below the trim margin or RNFG1 is reached and disconnected.

The operating margins described above can be calculated in real time based on prevailing conditions or in offline studies. Setting the margins dynamically (flexible margins) provides opportunity for increased access to capacity for RNFG units. Any detrimental effects on the distribution network of tripping RNFG units during normal operation must be considered. If the gradient of the power export when the margins are breached is known then the ANM scheme can employ an inverse time characteristic to determine the speed of response required. Knowledge of the gradient of the power export will also provide opportunity to set the ramp rate of the NNFG units, in addition to the set point issued, to achieve the reduction in export to the reset margin. This result in flexible operating margins, which will permit greater utilisation of available network capacity, based on prevailing network conditions.

The operating margins described above can be formulated to take account of probability theory. The probability of ramp rates occurring and coinciding (the ramp rates of the FG unit(s), NFG unit(s), RNFG unit(s) and electrical load), in addition to the probability of time factors being met or adequately set (in the calculation of the margins) can be included to allow the margins to cater for ANM parameter variations that are deemed to be acceptable, reasonable and regular. Variations that are out with such regular and acceptable variations may result in the individual or collective tripping of RNFG units.

As well as using the margins described above, there are a number of other methods of delivering the control of the participating energy producing/consuming devices including: direct calculation of the reduction/increase required with due consideration of the sensitivity (calculated in real-time or offline) of the network to the increase or decrease of the energy produced or consumed by the energy producing/consuming device; the use of optimisation techniques to identify the optimum participating energy producing/consuming device operating set point according to real-time or planned cost values and other assumptions, and the use of Proportional Integral Derivative (PID) control or similar to vary the required production or consumption of energy and response characteristic of the participating energy producing/consuming devices.

To provide a route to reduced curtailment for energy producing devices and an overall increase in the energy generated from renewable resources, one or more Energy Storage System (ESS) may be provided at or near critical circuits on the distribution network, with an interface to the ANM system. The approach to setting the operating margins can accommodate any storage technology. The ESS would act as another energy producing/consuming device that could provide support for constraint management through the ANM scheme. Equally, the ANM scheme can incorporate Demand Side Management (DSM) to provide crucial network support in the same manner as an ESS. Although the location of DSM may be remote to the critical circuits and in multiple locations, the ANM scheme can represent the available DSM capability in the setting of the operating margins. The ANM scheme can act as a stimulus for load increase, reduction and shifting. ANM can be used for increasing energy independence of individual or collective zones, for example to support islanding of part of an electricity network. In this case, the ANM scheme could provide information to the balancing generators relating to flows on the network and energy producing/consuming devices, and manage inter-zone power exchanges. The ANM scheme can also manage the interface between a private distribution network and the main grid by treating the private distribution network as an ANM control zone with other zones nested as required. The private distribution network would be monitored and controlled by the ANM scheme to facilitate micro-generation, DSM, ESS and increased energy independence from the wider grid.

A skilled person will appreciate that variations of the disclosed arrangements are possible without departing from the invention. For example, although the application of the ANM scheme to a distribution network has been presented, it can be deployed to maintain constraints on the transmission network. Also, forecasting techniques for wind generation, such as power production and ramp rate, and electrical demand could be used to enhance the ANM operation and could be incorporated into the setting of the trim and reset operating margins to maximise the use of the thermal capacity of the distribution network. Also variations of the disclosed arrangements could be applied to energy storage systems, generator control, islanded electrical systems, bottlenecks and interfaces on electrical systems. Accordingly the above description of the specific embodiment is made by way of example only and not for the purposes of limitation. It will be clear to the skilled person that minor modifications may be made without significant changes to the operation described.

What is claimed is:

1. A method for controlling a regulated group of energy producing/consuming devices in an electricity network, the method comprising:
    applying one or more fixed or variable sequential power flow trigger levels to disconnect individual regulated energy producing/consuming devices in the event that the sequential power flow trigger level is exceeded, wherein the regulated energy producing/consuming devices are individually and sequentially disconnected from the network;
    applying one or more reset power flow trigger levels which when breached reset the regulated energy producing/consuming devices to restart producing/consuming power, the reset power flow trigger level being lower than the sequential power flow trigger level;
    applying one or more trim power flow trigger levels, which when breached causes the regulated energy producing/consuming devices to reduce producing/consuming power; and
    monitoring power flow to determine when any of the one or more of the sequential power flow trigger levels, the trim power flow trigger levels, and the reset power flow levels are breached.

2. The method as claimed in claim 1, wherein the trim power flow trigger level is between the sequential trigger level and the reset power flow trigger level.

3. The method as claimed in claim 1 further comprising applying a trip operating margin which when breached causes all of the regulated energy producing/consuming devices to stop producing/consuming power.

4. The method as claimed in claim 1 further comprising calculating the one or more sequential power flow trigger levels in real time or offline as a function of one or more conditions.

5. The method as claimed in claim 1 further comprising varying one or more of the sequential power flow trigger levels, the reset power flow trigger levels, and the trim power flow levels.

6. The method as claimed in claim 5, wherein the one or more sequential power flow trigger levels, the reset power flow trigger levels, and the trim power flow levels are varied by an amount dependent on a gradient of power export.

7. The method as claimed in claim 6, wherein the gradient of power export is influenced by ramp rates of one or more of:
    the regulated energy producing/consuming devices;
    energy producing/consuming devices that have unconstrained access to the network during an N and N-1 condition (firm generation devices);
    energy producing/consuming devices that are required to curtail output to meet network constraints during the N-1 condition (non-firm generation); or
    the electrical load.

8. The method as claimed in claim 7 further comprising:
    assessing a probability of certain pre-determined ramp rates of energy producing/consuming devices occurring; and
    using this to determine at least one of the one or more sequential power flow trigger levels, the reset power flow trigger levels, and the trim power flow levels.

9. The method as claimed in claim 5, wherein at least one of the one or more sequential power flow trigger levels, the reset power flow trigger levels, and the trim power flow levels are varied by an amount dependent on a time taken to respond to a breach of a sequential power flow trigger level, the reset power flow trigger level, and the trim power flow level.

10. The method as claimed in claim 1, wherein one or more zones that have to be actively managed are defined in the network and the fixed or variable sequential power flow trigger levels, the reset power flow trigger levels, and the trim power flow trigger levels are defined within those zones.

11. A method as claimed in claim 10, wherein the one or more zones are defined by applying one or more fixed or variable sequential trigger levels to disconnect individual regulated energy producing/consuming devices in the event that the sequential power flow trigger level is exceeded.

12. The method as claimed in claim 10, wherein the one or more zones are defined by:
    determining the maximum power and/or current transmittable to or from a node or branch in the network at which an energy producing/consuming device that has to be regulated is located or is to be added;
    determining the maximum capacity of power and/or current transmittable through that node or branch; and
    defining a zone including the node or branch and regulated energy producing/consuming device that requires to be actively managed, in the event that the maximum power or current transmittable to the node or branch exceeds the maximum capacity of power or current transmittable through it.

13. A method as claimed in claim 1 further comprising:
    monitoring one or more power system parameters, such as voltage and/or current to determine power flow.

14. A system for controlling energy producing/consuming devices in an electricity network, the system being adapted to:

trip or disconnect, sequentially and individually, the energy producing/consuming devices in the event that one or more fixed or variable sequential power flow trigger levels is exceeded;
apply one or more reset power flow trigger levels which when breached reset the regulated energy producing/consuming devices to restart producing/consuming power, the reset power flow trigger level being lower than the sequential power flow trigger level;
apply one or more trim power flow trigger levels, which when breached causes the regulated energy producing/consuming devices to reduce producing/consuming power; and
monitor power flow to determine when any of the one or more sequential power flow trigger levels, the reset power flow trigger levels, and the trim power flow trigger levels are breached.

15. The system as claimed in claim 14 wherein the trim power flow trigger level is between the sequential power flow trigger level and the reset power flow trigger level.

16. The system as claimed in claim 14 adapted to apply a trip operating margin which when breached causes all of the regulated energy producing/consuming devices to stop producing/consuming power.

17. The system as claimed in claim 14 further comprising varying one or more of the sequential power flow trigger levels, the reset power flow trigger levels, and the trim power flow trigger levels.

18. The system as claimed in claim 17, wherein the one or more sequential power flow trigger levels, the reset power flow trigger levels, and the trim power flow trigger levels are varied by an amount dependent on a gradient of power export.

19. The system as claimed in claim 18, wherein the gradient of power export is influenced by ramp rates of one or more of:
the regulated energy producing/consuming devices;
energy producing/consuming devices that have unconstrained access to the network during an N and N-1 condition (firm generation devices);
energy producing/consuming devices that are required to curtail output to meet network constraints during the N-1 condition (non-firm generation); or
the electrical load.

20. The system as claimed in claim 19 operable to assess a probability of certain predetermined ramp rates of energy producing/consuming devices occurring and using this to determine the one or more sequential power flow trigger levels, the reset power flow trigger levels, and the trim power flow trigger levels.

21. The system as claimed in claim 14 wherein one or more zones that have to be actively managed are defined in the network and the fixed or variable sequential power flow trigger levels, the reset power flow trigger levels, and the trim power flow trigger levels are defined within those zones.

22. The system as claimed in claim 21, wherein the one or more zones are defined by:
determining the maximum power and/or current transmittable to or from a node or branch in the network at which an energy producing/consuming device that has to be regulated is located or is to be added;
determining the maximum capacity of power and/or current transmittable through that node or branch; and
defining a zone including the node or branch and regulated energy producing/consuming device that requires to be actively managed, in the event that the maximum power and/or current transmittable to the node or branch exceeds the maximum capacity of power and/or current transmittable through it.

23. A system as claimed in claim 14, the system further adapted to:
receive information on one or more measured power system parameters, such as voltage and/or current within one or more zones that have to be actively managed;
apply the one or more sequential power flow trigger levels, the reset power flow trigger levels and the trim power flow trigger levels to each zone; and
monitor power flow using the one or more measured power system parameters to determine when any of the one or more sequential power flow trigger levels, the reset power flow trigger levels, and the trim power flow trigger levels are breached in a zone.

24. The system as claimed in claim 23 including at least one sensor or monitoring device for sensing or monitoring the power system parameters.

25. The system as claimed in claim 23, wherein the system comprises one or more controllers or processors for receiving the information, wherein said system is further adapted to apply the parameters and controlling the regulated energy producing/consuming devices.

26. The system as claimed in claim 23, wherein communication means are provided for communicating the sensed parameters to the controller.

27. The system as claimed in claim 23, wherein means are provided for communicating control instructions from the controller to the energy producing/consuming devices.

28. A system as claimed in claim 23, the system further adapted to apply a trip operating power flow level at which all of the producing/consuming devices are disconnected.

29. A computer program having code or instructions on a non-transitory data carrier or computer readable medium for controlling a computer, said computer program comprising instructions for:
applying one or more fixed or variable sequential power flow trigger levels to disconnect individual regulated energy producing/consuming devices in the event that the sequential power flow trigger level is exceeded, wherein the regulated energy producing/consuming devices are individually and sequentially disconnected from the network;
applying one or more reset power flow trigger levels which when breached reset the regulated energy producing/consuming devices to restart producing/consuming power, the reset power flow trigger level being lower than the sequential power flow trigger level;
applying one or more trim power flow trigger levels, which when breached causes the regulated energy producing/consuming devices to reduce producing/consuming power; and
monitoring power flow to determine when any of the one or more of the sequential power flow trigger levels, the trim power flow trigger levels, and the reset power flow levels are breached.

* * * * *